United States Patent Office 3,639,312
Patented Feb. 1, 1972

3,639,312
OLEFIN POLYMERS CONTAINING SUGARS
Robert B. Turner, Lake Jackson, Tex., assignor to The Dow Chemical Company, Midland, Mich.
No Drawing. Filed Feb. 25, 1969, Ser. No. 802,233
Int. Cl. C08f 45/67, 29/10; C08b 29/30
U.S. Cl. 260—17.4 SG                       9 Claims

ABSTRACT OF THE DISCLOSURE

Fabricated articles of olefin polymers having improved optical properties are prepared by incorporating a small amount of a sugar such as sucrose into an olefin polymer such as polyethylene prior to fabricating an article from the polymer.

BACKGROUND OF THE INVENTION

This invention relates to olefin polymer compositions containing small amounts of sugars and to films fabricated therefrom which have improved optical properties such as gloss.

Films and other articles fabricated from olefin polymers are widely utilized in the production of textiles, protective coatings for various articles and the like. Films of olefin polymers are especially valuable in the packaging and wrapping arts because of their high tensile strength and other physical properties.

However, in some instances, films of olefin polymers are hazy and translucent rather than glossy and transparent which are often desirable for many applications.

In order to improve the optical properties of such film, it has sometimes been the practice of the art to crosslink the particular polymer by irradiation and also by chemical reaction using, e.g., peroxides, hydroperoxides, azo-compounds and the like, followed by subjecting the polymer to a curing step at elevated temperatures. In general, these crosslinking methods have the drawback that processing operations subsequent to crosslinking such as extrusion, molding, or the like to put the crosslinked polymer in the form of film or other shaped articles can be performed, if at all, with much difficulty. This is so because crosslinking of the polymer greatly decreases the flow properties of the polymer, often to the point where the polymer is generally thermoset instead of thermoplastic. While it is possible to crosslink the polymers after fabrication into films or shaped articles, crosslinking operations are generally too difficult and too expensive for small packing operators, etc.

More recently, various additives have been incorporated into olefin polymers prior to fabrication in order to provide films and other shaped articles having improved optical properties. Unfortunately, most conventional additives are either somewhat toxic, expensive, and/or have deleterious effects on the physical properties of fabricated articles.

In view of the need for films and other shaped articles of olefin polymers having improved optical properties, it would be highly desirable to provide an inexpensive, non-toxic olefin polymer composition capable of being fabricated into an article having improved optical properties in addition to the desired strength, flexibility and the like.

SUMMARY OF THE INVENTION

In accordance with this invention, films and other shaped articles of olefin polymers having improved optical properties are economically and easily fabricated from a composition of a normally solid, thermoplastic olefin polymer and from about 25 to about 10,000 p.p.m. of a sugar based on the polymer. Films or thin sheets of olefin polymers prepared in the practice of this invention are useful as food packaging materials, protective covering for various articles such as metal tools, furniture, appliances, and the like. The novel polymer compositions are also employed in the fabrication of pipe, bottles, filaments, blown tubing and the like, especially where the gloss of the fabricated polymer is important.

DESCRIPTION OF THE PREFERRED EMBODIMENTS

The novel polymer compositions of this invention have as essential components: (1) a normally solid, thermoplastic olefin polymer and (2) a sugar.

Generally any of the known olefin polymers acquire improved optical properties when employed in the practice of this invention. However, olefin polymers which exhibit particularly noticeable improvements in the aforementioned optical properties are the normally solid, thermoplastic polymers of olefin monomers having from 2 to 8 carbon atoms per molecule. Characteristically the above olefin polymers have densities in the range from 0.890 to 0.975 gm./cc.; however, in the practice of this invention olefin polymers having densities ranging from about 0.915 to about 0.935 exhibit the most notable improvement in optical properties. Illustratively, suitable polymers include polymers of ethylene, propylene, 1-butene, 1-pentene, 1-hexene, 1-octene, 6-methyl-1-heptene, 5-methyl-1-heptene, 3-methyl-1-butene, 3-methyl-1-pentene and the like. The aforementioned α-olefins can be polymerized alone or in admixture with each other to obtain solid polymers. Also these olefins can be copolymerized with other ethylenically unsaturated monomers such as the vinyl esters, e.g., vinyl acetate, vinyl propionate, vinyl butyrate and the like; the alkyl esters of α,β-ethylenically unsaturated carboxylic acids, e.g., ethyl acrylate, methyl methacrylate, ethyl fumarate, propyl itaconate, butyl citraconate and the like; the α,β-ethylenically unsaturated carboxylic acids and anhydrides, e.g., acrylic acid, methacrylic acid, fumaric acid, maleic acid and anhydride, and the like; and other ethylenically unsaturated monomers, e.g., vinyl chloride, vinylidene chloride, acrylonitrile, acrylamide and the like. Characteristically, such copolymers of the α-olefins and the above-described ethylenically unsaturated monomers contain less than about 30 weight percent of ethylenically unsaturated monomer. In addition, blends of the aforementioned olefin polymers are also suitable. Of the above-mentioned olefin polymers, polyethylene is preferred. Specific procedures and means for making the above-described olefin polymers are known to the art and do not constitute a part of the present invention.

Sugars suitable for the purposes of this invention include the mono-, di- and polysaccharides, for example, sucrose, fructose, glucose, arabinose, mannose, maltose, rhamnose, gentiobiose, sorbose, ribose, xylose, idose, lyxose, lactose, allose, altrose, gulose, galactose, erythrose, threose, cellobiose, and the like. Of the aforementioned sugars, sucrose is generally preferred.

Di- and polysaccharides are present in cane sugar, beet sugar, molasses and corn sugar. Monosaccharides are conveniently prepared by hydrolysis of the readily obtainable inexpensive di- and polysaccharides.

Compositions in accordance with this invention comprise from about 50 to 100 weight percent of an olefin polymer, as hereinbefore described, having incorporated therein from about 25 to about 10,000 p.p.m. of at least one of the above described sugars, preferably from about 500 to about 5000 p.p.m. of sugar based on the olefin polymer. At sugar concentrations less than about 25 p.p.m. in the olefin polymer, the amount of sugar is generally insufficient to provide a noticeable improvement in the optical properties of the resulting fabricated article. At sugar concentrations greater than about 10,000 p.p.m. based on the olefin polymer, the physical properties of the polymer, for example, strength, flexibility, etc., are sometimes adversely affected. In addition, no further improvement in optical properties is observed with sugar concentrations greater than 10,000 p.p.m. Optionally the novel olefin polymer compositions of this invention contain conventional amounts of other additives such as fillers, stabilizers, antioxidants, plasticizers, tackifiers, lubricants, antistatic agents, and the like, provided the additives are not present in amounts sufficient to alter the efficacy of the sugar.

The olefin polymer compositions are readily prepared by any method suitable for insuring a uniform mixture of olefin polymer and sugar which can then be blown, drawn or extruded to form a film or otherwise fabricated into other shaped articles. Such methods include, for example, incorporation of the sugar by melt blending or fluxing of the ingredients in an apparatus such as a Banbury mixer, heated rolls, heated extruders of the single or double screw type, or in any other conventional apparatus used to compound plastics; dry blending in a tumbler mill; preparation of a concentrate of olefin polymer and sugar by one of the above-mentioned methods and then blending of this concentrate with olefin polymer molding powder by tumbling or other suitable means; or any combination of the above-mentioned methods. When the olefin polymer and sugar are blended or mixed at high temperatures, care should be exercised so that a temperature is not reached which will caramelize the sugar. As a general rule temperatures at or below about 200° C. are sufficient to permit fabrication of the polymer into various shapes. Such temperatures generally do not cause caramelization of the sugar.

Subsequent to thorough mixing of the sugar with the olefin polymer, the composition can be shaped into the form of a film or filament by raising the temperature of the composition to above the melting point of the olefin polymer and extruding the heated composition through a slit or die to form an extruded body. In the preparation of film it is preferred that the heat plastified composition be extruded through an annular die, blown into a bubble, cooled, collapsed and cut into film of desired length and width. Generally the films or filaments have a thickness or a diameter in the range of 0.01 to 100 mils or more, usually 0.1 to 50 mils or more in the case of the filament. In the preparation of other shaped articles such as pipes, bottles, blown tubing, etc., it is generally preferred to fabricate such articles by extrusion or extrusion in combination with blowing. In order to avoid caramelizing the sugar, it is understood that the temperature limitations applicable to mixing the ingredient are generally applicable in fabricating the composition.

The following examples are given as illustrations of the invention and are not to be construed as limiting its scope. Throughout this specification and claims, all parts and percentages are by weight unless otherwise indicated.

EXAMPLE 1

A 0.5-part portion of cane sugar is dry blended for 15 minutes with 99.5 parts of powdered polyethylene having a melt index as determined by ASTM D-1238-65T(E) of 2.4 decig./min. and a density of 0.922 gm./cc. The resulting blend is compounded by extruding the blend twice at 350° F. and then pelletized. The pelletized blend is extruded through an annular die at 350° F. and blown into a 1.5 mil film. The resulting film is tested for optional and physical properties and the results are recorded in Table I.

For the purposes of comparison, a sample ($C_1$) of the polyethylene used in Example 1 is compounded, extruded and blown into a 1.5 mil film according to the procedure of Example 1. The resulting film ($C_1$) is similarly tested and the results are shown in Table I.

TABLE I

| Example No. | 1 | $C_1$ [1] |
|---|---|---|
| Haze, percent [2] | 6.4 | 6.6 |
| Gloss, percent [3]: | | |
| 20° head | 94 | 83 |
| 45° head | 79 | 77 |

[1] Not an example of the invention.
[2] As determined by ASTM D-1003.
[3] 45° Gloss as determined by ASTM D-2457. 20° Gloss also as determined by ASTM D-2457 except that angle between light source and reflected light is 20° instead of 45°.

Physical properties of the above films such as impact strength, slip properties and tear resistance are substantially the same.

EXAMPLE 2

A 100-part portion of polyethylene having a density of 0.9207 gm./cc. and a melt index of 3.28 decig./min. is dry blended with 500 p.p.m. of fructose for 15 minutes. The resulting blend is compounded by extruding the blend once at 290° F. and once at 350° F. and then pelletized. The pelletized blend is then extruded and blown into a 1.5 mil film under the same conditions employed in Example 1. The resulting film is tested according to the test methods of Example 1 and the results are recorded in Table II.

For the purposes of comparison, a sample ($C_2$) of the polyethylene used in Example 2 is similarly compounded, extruded and blown into 1.5 mil film. The resulting film is similarly tested and the results are recorded in Table II.

EXAMPLE 3

A 100-part portion of the polyethylene used in Example 2 and 1500 p.p.m. of arabinose are blended, compounded and pelletized according to Example 1 and the resulting blend is extruded and blown into a 1.5 mil film in the same manner. The resulting film is tested according to test methods used in Example 1 and the results are recorded in Table II for the purpose of comparison.

TABLE II

| Example No. | 2 | $C_2$ [1] | 3 |
|---|---|---|---|
| Haze, percent [2] | 4.65 | 4.52 | 4.55 |
| Gloss, percent [3]: | | | |
| 20° head | 95 | 90 | 95 |
| 45° head | 82 | 80 | 79 |

[1] Not an example of this invention.
[2] Same as in Table I.
[3] Same as in Table I.

In addition to the above examples, fabricated articles of compositions of other olefin polymers, such as copolymers of ethylene with butene-1, isobutyl acrylate, vinyl acetate, ethyl acrylate, methyl methacrylate and the like, exhibit improved gloss when specified amounts of sugars, such as sucrose, glucose, fructose, galactose, mannose, maltose and the like, are incorporated therein. It is also found that the optical properties of fabricated articles of the homo- and copolymers of propylene, isobutylene and the like are similarly improved.

What is claimed is:

1. A composition of a normally solid, thermoplastic olefin polymer and from about 25 to about 10,000 p.p.m. of a sugar based on the polymer, said composition being capable of fabrication into an article having improved optical properties.

2. The composition according to claim 1 wherein the sugar is polysaccharide.

3. The composition according to claim 2 wherein the polysaccharide is sucrose.

4. The composition according to claim 1 wherein the sugar is a monosaccharide.

5. The composition according to claim 4 wherein the monosaccharide is fructose.

6. The composition according to claim 1 wherein the olefin polymer is an ethylene polymer.

7. The composition according to claim 6 wherein the ethylene polymer is polyethylene.

8. The composition of claim 1 in the form of a film.

9. A process for improving the optical properties of a normally solid, thermoplastic olefin polymer comprising.
  (a) thoroughly mixing in said polymer from about 25 to about 10,000 p.p.m. of a sugar,
  (b) then heating the polymer to a temperature above the melting point of said polymer, but with the proviso that said temperature be below the temperature at which said sugar caramelizes and
  (c) fabricating the heated polymer into a shaped article.

References Cited

UNITED STATES PATENTS

| 3,179,607 | 4/1965 | Suoa et al. | 260—17.4 |
| 2,875,047 | 2/1959 | Oster | 260—17.4 X |
| 2,433,098 | 12/1947 | De Bacher | 260—19 |

FOREIGN PATENTS

| 1,126,849 | 9/1968 | Great Britain | 260—17.4 |
| 1,051,320 | 12/1964 | Great Britain | 260—17.4 |

WILLIAM H. SHORT, Primary Examiner

R. J. KOCH, Assistant Examiner

U.S. Cl. X.R.

260—93.7, 94.9 R, 94.9 GD; 264—1

PO-1050
(5/69)

UNITED STATES PATENT OFFICE
CERTIFICATE OF CORRECTION

Patent No. 3,639,312                  Dated    1 February 1972

Inventor(s)    Robert B. Turner

It is certified that error appears in the above-identified patent and that said Letters Patent are hereby corrected as shown below:

Column 6, under References Cited, U.S. Patents, please add the following:

--2,375,396    5/45    Watkins
  3,067,153   12/62    Hock et al--

Signed and sealed this 8th day of August 1972.

(SEAL)
Attest:

EDWARD M. FLETCHER, JR.          ROBERT GOTTSCHALK
Attesting Officer                   Commissioner of Patents